United States Patent
Lindqvist

(10) Patent No.: US 11,571,972 B2
(45) Date of Patent: Feb. 7, 2023

(54) DETECTION OF MAINTENANCE STATUS FOR A PANTOGRAPH AND/OR A CONTACT WIRE

(71) Applicant: Railway Metrics and Dynamics Sweden AB, Stockholm (SE)

(72) Inventor: Jan Lindqvist, Stockholm (SE)

(73) Assignee: RAILWAY METRICS AND DYNAMICS SWEDEN AB, Stockholm (SE)

(*) Notice: Subject to any disclaimer, the term of this patent is extended or adjusted under 35 U.S.C. 154(b) by 328 days.

(21) Appl. No.: 16/770,997

(22) PCT Filed: Dec. 12, 2018

(86) PCT No.: PCT/SE2018/051296
§ 371 (c)(1),
(2) Date: Jun. 9, 2020

(87) PCT Pub. No.: WO2019/117796
PCT Pub. Date: Jun. 20, 2019

(65) Prior Publication Data
US 2020/0369155 A1    Nov. 26, 2020

(30) Foreign Application Priority Data
Dec. 12, 2017   (SE) .................................. 1751530-5

(51) Int. Cl.
*B60L 5/24*    (2006.01)
*B60M 1/28*    (2006.01)
(Continued)

(52) U.S. Cl.
CPC .................. *B60L 5/24* (2013.01); *B60L 3/00* (2013.01); *B60L 3/12* (2013.01); *B60L 5/00* (2013.01);
(Continued)

(58) Field of Classification Search
CPC .. B60L 3/00; B60L 3/04; B60L 3/0092; B60L 3/06; B60L 3/12; B60L 5/00;
(Continued)

(56) References Cited

U.S. PATENT DOCUMENTS 8,914,162 B2 *  12/2014  Kernwein ............. B61L 25/025
                                                         701/1
9,395,276 B2 *   7/2016  Kristen .................... B61K 9/12
(Continued)

FOREIGN PATENT DOCUMENTS

DE    102016201416 A1 *  8/2017  ............. B60M 1/28
JP       2011244664 A    12/2011
(Continued)

OTHER PUBLICATIONS

International Search Report from corresponding International Application PCT/SE2018/051296 dated Feb. 5, 2019, 4 pages.
(Continued)

*Primary Examiner* — Zachary L Kuhfuss
*Assistant Examiner* — Cheng Lin
(74) *Attorney, Agent, or Firm* — Cooper Legal Group, LLC; Ronald M. Kachmarik

(57) ABSTRACT

A method and associated system for determining a maintenance status for a pantograph arranged on a vehicle and/or a contact wire intended to be in electrical contact with the pantograph. Monitoring at least longitudinal, vertical or lateral accelerations of the pantograph. Detecting an acceleration pattern based on the monitored accelerations of the pantograph. Determining accelerations in a direction above a predetermined value in the detected acceleration pattern. Determining a maintenance status for the pantograph and/or the contact wire based on the detected acceleration pattern, and wherein the maintenance status indicates a level of wear on the pantograph and/or the contact wire.

16 Claims, 3 Drawing Sheets

(51) Int. Cl.
  *B61L 25/02* (2006.01)
  *B60L 3/12* (2006.01)
  *B60L 5/00* (2006.01)
  *B60L 3/00* (2019.01)
  *B61L 15/00* (2006.01)

(52) U.S. Cl.
  CPC ............ *B60M 1/28* (2013.01); *B61L 15/0081* (2013.01); *B61L 25/025* (2013.01)

(58) Field of Classification Search
  CPC .......... B60L 5/24; B60L 5/26; B60L 2200/26; B60L 2240/622; B60L 25/025; B60L 15/0081; B60M 1/28
  See application file for complete search history.

(56) References Cited

U.S. PATENT DOCUMENTS

| | | | |
|---|---|---|---|
| 2002/0134631 A1* | 9/2002 | Brand | B60L 5/28 |
| | | | 250/221 |
| 2007/0000744 A1* | 1/2007 | Craig | B60L 5/205 |
| | | | 191/2 |

FOREIGN PATENT DOCUMENTS

| | | | | |
|---|---|---|---|---|
| WO | WO-2013129153 A1 * | 9/2013 | | B60M 1/28 |
| WO | WO-2018025329 A1 * | 2/2018 | | B60L 13/006 |

OTHER PUBLICATIONS

Hongrui Wang et al. "Identification of the catenary structure wavelength using pantograph head acceleration measurements", 2017 International instrumentation and Measurement Technology Conference (I2MTC), May 22-25, 2017, Turin, Italy, ISBN 978-1-5090-3596-0; whole document.

* cited by examiner

DETECTION OF MAINTENANCE STATUS FOR A PANTOGRAPH AND/OR A CONTACT WIRE

TECHNICAL FIELD

The present invention generally relates to the field of maintenance for pantographs. Specifically, a method and a system are provided for detecting a maintenance status for a pantograph.

BACKGROUND

A pantograph is commonly used for collecting power through contact with an overhead contact wire. Pantographs may be mounted on, for example, trains, trams and electric buses. The pantograph is in contact with an overhead contact wire through a carbon rail. Graphite conducts electricity while working as a lubricant. As graphite is relatively brittle, pieces may break off during operation. Worn-down pantographs can seize the overhead wire and tear it down, causing long disruptions in, for example, train services.

The contact wire being in electrical contact with the pantograph is also worn down with time. This might result in parts of the overhead power line, besides the contact wire to unwantedly come in contact with a passing pantograph, such as the clamps holding the contact wire from above. This might result in the pantograph to cling on to, or be damaged by, the parts of the overhead power line that is not meant to be in contact with the pantograph.

One solution for avoiding this problem is monitoring pantographs passing certain points of a railway system. These are normally based on a vision system which takes pictures of the pantographs and performs an analysis based on computer vision algorithms. However, it would be very expensive to mount cameras over a whole railway system.

Another solution, also referred to as auto drop, is to have an automatic lowering function in the pantograph, where the pantograph is lowered when the rail in contact with the contact wire is damaged. Automatic lowering is commonly implemented via air tubes in the carbon rail in contact with the lifter, lifting the pantograph via air pressure. If the rail is damaged or run down, the air tubes may leak, and in response the pantograph is lowered. However, this solution does not provide any way of monitoring the need for maintenance before the pantograph breaks.

Therefore, a challenge in the present field is how to provide better maintenance monitoring for pantographs and the wire intended to be in electrical contact with the carbon rail.

SUMMARY

An object of the present invention is therefore to mitigate at least some of the drawbacks described above. To achieve this, a method and a system for determining a maintenance status for a pantograph arranged on a vehicle and/or a contact wire intended to be in electrical contact with the pantograph is provided.

According to a first aspect of the invention, a method for determining a maintenance status for a pantograph arranged on a vehicle and/or a contact wire intended to be in electrical contact with the pantograph is provided. The method comprises the steps of monitoring at least longitudinal, vertical or lateral accelerations of the pantograph, detecting an acceleration pattern based on the monitored accelerations, and determining accelerations in a direction above a predetermined value in the detected acceleration pattern. The method further comprises determining a maintenance status for the pantograph and/or the contact based on the detected acceleration pattern, and wherein the maintenance status indicates a level of wear on the pantograph and/or the contact wire.

According to a second aspect, a system for determining a maintenance status for a pantograph arranged on a vehicle and/or a contact wire intended to be in electrical contact with the pantograph is provided. The system comprises a sensor arranged to monitor longitudinal, vertical or lateral accelerations of a pantograph of a vehicle, and a control unit. The control unit is adapted to detect an acceleration pattern based on the measurements performed by the sensor, determine accelerations in a direction above a predetermined value in the acceleration pattern, and determine a maintenance status for the pantograph and/or the contact wire based on the detected acceleration pattern, and wherein the maintenance status indicates a level or wear on the pantograph and/or the contact wire.

Pantographs commonly have a carbon rail for conducting current from the contact wire. As a pantograph is used, the carbon rail is in contact with the contact wire. This causes friction and the carbon rails to be run down. This causes portions of the carbon rails to become uneven. The uneven portions may cause the pantograph to move more than if the carbon rail was new and not uneven. With the present method and system, the pantograph's accelerations are monitored, and a movement pattern is detected in the accelerations. Based on the movement pattern having accelerations above a predetermined level, it may be determined that the pantograph is in need of maintenance, and an indication of a level of wear on the pantograph may be determined. In this way, wear on the pantograph may be determined before the wear on the pantograph reaches a critical level. This allows for better estimating the maintenance need for the vehicle or the pantograph, i.e. the maintenance may be planned instead of being acute or the pantograph breaking and potentially damaging the contact wire.

In addition, the friction between the carbon rail and the contact wire will also affect the contact wire negatively. The friction will cause the contact wire to be worn down but with a much lower rate than that of the carbon rails.

This might lead to the device linking the dropper to the contact wire, such as a clamp or similar gripping device holding the contact wire from above, being exposed to the carbon rail. This will in turn risk causing unwanted damages to the carbon rail and in the long run risk the contact wire to be torn down.

Other, here not stated reasons for having a faulty contact wire might also be present that is determinable and giving rise to a characteristic acceleration in the pantograph.

By detecting a maintenance need before the pantograph breaks the service level of the vehicle may be increased and service disruptions due to faulty pantographs may be avoided. For example, it is common that faulty pantographs on trains tear down the contact wire. This may block a whole track, causing disruptions not only to the train on which the pantograph is arranged, but also to other trains scheduled on the same track. This may be very costly and inconvenient.

In a similar way, by determining the maintenance status of the contact wires, faulty contact wires may be identified before costly and inconvenient service disruptions occur.

Further, in comparison with previous maintenance detection systems based on image recognition, in the present disclosure the maintenance need may be monitored continuously or periodically as the sensor is arranged on the vehicle, and not on the ground as in the example of the cameras for image recognition. Wear on the pantograph and/or the contact wire may thereby be detected early.

Commonly, maintenance of pantographs is scheduled regularly. Since they are often located on top of vehicles, ocular inspection is inconvenient, and may be dangerous to the person performing the inspection. This may cause inspection to be skipped, and for pantographs to only be checked during their scheduled maintenance times. At those points in time, the pantograph maintenance may not be at an optimal point in time. For example, the pantograph may be used for six more months before maintenance is needed, or the pantograph has already been broken and is at risk for breaking the contact wire. With the method of the current disclosure, the maintenance may be scheduled more efficiently, as the maintenance status may be monitored over time.

With the term "pantograph" it is meant an electric current collector. Pantographs may be mounted on vehicles, such as trolleybuses, trams, electric locomotives or any other vehicle in need of electricity, to carry electrical power from overhead lines or electrical third rails to the electrical equipment of the vehicle.

By "contact wire" it is meant part of a current provider such as an overhead line intended to be in electrical contact with the pantograph.

By "maintenance status" it may be meant a level of wear on the pantograph and/or the contact wire, i.e. how much the pantograph and/or contact wire needs maintenance. For example, a low level of wear on the pantograph and/or the contact wire would mean a maintenance status indicating a low need for maintenance, whereas a high level of wear on the pantograph and/or the contact wire would mean a maintenance status indicating a high need of maintenance.

The "acceleration pattern" may be interpreted as accelerations or movements over time for the pantograph.

The "predetermined value" may be a fixed predetermined value, or in relation to previously monitored accelerations.

It has been realized that wear on a pantograph arranged on a vehicle affects the interaction between a contact wire and the pantograph. This interaction may cause the pantograph to accelerate or move in a specific acceleration pattern, for example, having higher accelerations than when new and not worn down. By monitoring the accelerations of the pantograph, such acceleration changes or changes in the acceleration pattern may be detected. Based on such acceleration changes a maintenance status indicating the level of wear on the pantograph may be determined. For example, the maintenance status may indicate that maintenance should be scheduled within a certain time period, that there is a low wear on the pantograph and no action would be needed, or that the pantograph has a very high wear and is close to breaking, and should not be used and be repaired as soon as possible.

It has also been realized that wear on a contact wire in contact with a pantograph affects the interaction between the contact wire and the pantograph. A contact wire in need of maintenance might result in characteristic acceleration patterns induced in the pantograph that's distinguishable from acceleration patterns caused by a pantograph in contact with an unaffected contact wire that's not in need of maintenance. For instance, the gripping device or clamping device holding the contact wire from above might be exposed, i.e risk striking the pantograph when the pantograph is passing, either due to mechanical failure in the clamp itself or due to wear down of the contact wire. By monitoring the accelerations of the pantograph, such acceleration changes or changes in the acceleration pattern may be detected. Based on such acceleration changes a maintenance status indicating the level of wear on the contact wire may be determined. For example, the maintenance status may indicate that maintenance should be scheduled within a certain time period, that there is a low wear on the contact wire and no action would be needed, or that the contact wire has a very high wear and is close to breaking, and should not be used and be repaired as soon as possible. To distinguish if a measured acceleration in the pantograph is caused by wear down of the pantograph or from acceleration caused by the contact wire being worn there could be analysis made on the measured acceleration and from, for example, orientation of acceleration, frequency of oscillation and/or other characteristic signal features the source causing the acceleration is identified.

According to an embodiment, the accelerations are measured by a sensor arranged on the pantograph. The sensor may be arranged on the bottom of the pantograph which may be relatively far away from the contact wire, or higher up, which may be closer to the contact wire.

By arranging the sensor on the pantograph, the movements of the pantograph may be measured directly. This allows for less noise in the measurements, as compared to arranging the sensor on the vehicle.

On some vehicles, the pantograph may be arranged on resilient units, which may further isolate the movements of the pantograph from the movements of the vehicle.

The method may in some embodiments further comprise sending an alert indicating the maintenance status. The alert may, for example, be sent to a terminal arranged in a cab of the vehicle, or somewhere else where it is beneficial for an operator of the vehicle to receive it. In this way, the operator of the vehicle may act on the information in the alert by, for example, lowering the pantograph if the wear on the pantograph and/or contact wire is high and use a secondary pantograph or another backup energy source instead.

The alert may be sent to a central unit of the vehicle or a central server for the system. This allows for saving data for further processing, such as for monitoring the maintenance status over time. The saved data may be used for improving algorithms for detecting the maintenance status.

According to an embodiment, the method further comprises lowering the pantograph from a contact wire in response to a maintenance status above a predetermined level. For example, the predetermined level may be a level indicating a high wear on the pantograph, which could indicate that the pantograph is at risk for breaking and thereby breaking the contact wire.

By lowering the pantograph when the maintenance status is above a predetermined level allows for decreasing the risk for breaking the pantograph or the contact wire.

According to an embodiment, the group of possible maintenance statuses comprises at least indications for a no need for maintenance, a low need for maintenance or an acute need for maintenance. Also other statuses may be used. For example, the maintenance status may be on a scale between 1-100, or on another scale.

According to an embodiment, the method further comprises monitoring accelerations of the vehicle, and wherein the detecting further comprises comparing accelerations of the vehicle with accelerations of the pantograph to determine the accelerations of the pantograph in relation to the contact wire.

According to an embodiment, the method further comprises registering geographical data and combine information of geographical data with detected acceleration of pantograph and/or the vehicle.

According to an embodiment, the method may comprise registering geographical data when detected maintenance status is above a predetermined level.

The geographical data may, for example, be sent to a central unit of the vehicle or a central server for the system. This allows for saving data for further processing, such as for monitoring the maintenance status over time. The saved data may be used for improving algorithms for determining the maintenance status.

The geographical data may further help diagnosing the cause of induced acceleration in the pantograph. For instance, if a sudden acceleration is measured for one or several vehicles at the same geographical position this might indicate a worn-out contact wire. By comparing measured acceleration of vehicle to measured acceleration of the pantograph there is an even stronger indication that the measured acceleration is affected by a faulty contact wire, since possible sources of acceleration changes from the surface of which the vehicle is traveling on is compensated for. With this inventive method there will also be possible to identify possible faulty tracks if the vehicle is track bound. As the pantograph is arranged on the vehicle, the movements and accelerations of the vehicle affects the pantographs accelerations. By monitoring the accelerations of the vehicle and the accelerations of the pantograph, the pantograph's accelerations in relation to the contact wire or in relation to the vehicle may be detected. For example, a high acceleration of both the pantograph and the vehicle in one direction may mean that the acceleration originates from the vehicle hitting a bump in the track or road, whereas a high acceleration for the pantograph but not for the vehicle may indicate an uneven portion on the carbon rail of the pantograph and a need for maintenance for the pantograph. In this way, noise in the monitoring of the accelerations from the vehicle may be avoided.

According to an embodiment of the second aspect, the control unit is configured to send an alert indicating a maintenance status.

The alert may, for example, be sent to a terminal arranged in a cab of the vehicle, or somewhere else there it is beneficial for an operator of the vehicle to receive it. In this way, the operator of the vehicle may act on the information in the alert by, for example, lowering the pantograph if the wear is high and use a secondary pantograph or another backup energy source instead. This may decrease the risk for damages to the contact wire.

The alert may be sent to a central unit of the vehicle or a central server for the system. This allows for saving or monitoring the maintenance status over time. The saved data may be used for improving algorithms for detecting the maintenance status.

The sensor may be connected to the control unit via wireless communication means. This allows for arranging the control unit at a different location than the sensor. For example, the sensor may be arranged on the pantograph, and the control unit may be arranged in the vehicle where it may be kept away from weather and from dirt. This allows for a decreased wear on the control unit.

Further, having the control unit separate from the sensor may allow for arranging a lighter device on the pantograph, which may affect the acceleration of the pantograph less than a heavier device.

The wireless communication means may in an embodiment be a local wireless network. The wireless communication means may be a communication means not dependent on external system, such as, for example, Bluetooth or a local wireless network. In this way, the wireless communication may work even if the vehicle is out of range for, for example, GSM or 3G communications.

The system may further comprise a central server connected to the control unit. The central server may, for example, receive messages or alerts indicating the maintenance status for the pantograph. The central server may store the information received and use for analyzing or improving the detection of the maintenance status for the pantograph.

The system may further comprise a user terminal connected to the control unit. The user terminal may, for example, be used by an operator of the vehicle or an operator monitoring a grid of contact wires. For example, alerts indicating a maintenance status of the pantograph or other information relating to the pantograph may be sent to the user terminal.

BRIEF DESCRIPTION OF DRAWINGS

The invention, and other aspects, will now be described in more detail in the following illustrative and non-limiting detailed description of embodiments, with reference to the appended drawings.

All the figures are schematic, not necessarily to scale, and generally only disclosing parts which are necessary in order to elucidate the embodiments, wherein other parts may be omitted. Like reference numerals refer to like elements throughout the description.

DETAILED DESCRIPTION

Figure 1:
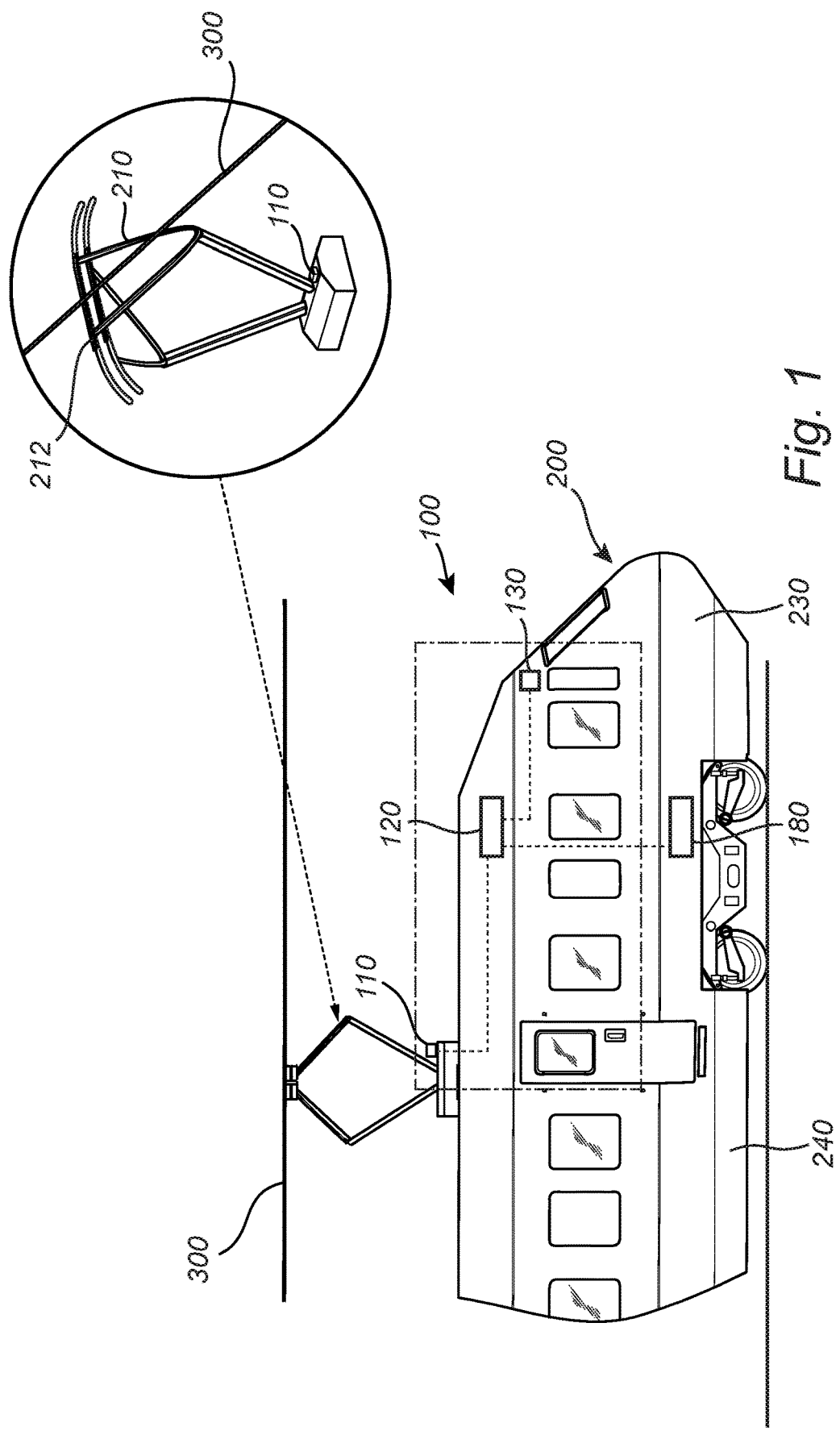
FIG. 1 is a schematic view of a system according to an embodiment arranged on a vehicle.

An embodiment of the system 100 for determining a maintenance status for a pantograph 210 arranged on a vehicle 200 is shown in FIG. 1. The system 100 is arranged on a vehicle 200, in this example a train. The vehicle 200 has a pantograph 210 arranged on the roof of the train 200. The pantograph 210 is adapted to collect a current from a contact wire 300 via carbon rails 212 to power the vehicle 200. The system comprises a sensor 110 for monitoring accelerations of the pantograph and the sensor is arranged on the pantograph 210. The system further comprises a control unit 120, a user terminal 130 and a sensor 180 for monitoring accelerations of the vehicle 200.

The pantograph 210 may be any type of pantograph for powering a vehicle 200, for example, a half-pantograph (Z-pantograph), a diamond shaped pantograph or another type of pantograph. The carbon rails 212 may comprise graphite. As the pantograph 210 is in use, the pantograph 210 will be in touching contact with the contact wire 300. This causes the carbon rails 212 to be worn down by the friction between the carbon rails and the contact wire. When the carbon rails 212 are worn down, uneven portions are created on the surface of the carbon rails 212, which may cause a higher friction in the interaction with the contact wire 200.

The contact between the pantograph and the wire will cause accelerations or movements in the pantograph 210. The accelerations are monitored by the sensor 110. The sensor 110 may send data about the accelerations to the control unit 120. The data may be sent wirelessly or over a wire. If the data is sent over wireless communication, it may be sent via a local communications network, such as Bluetooth or Wi-Fi.

The control unit 120 may detect an acceleration pattern for the pantograph 210, and determine, based on the acceleration pattern, if portions of the acceleration pattern are above a predetermined level. The control unit 120 may then determine a maintenance status indicating a level of wear on the pantograph 210 based on the acceleration pattern.

The control unit 120 may send an alert to, in this example, a user terminal 130. The user terminal 130 is in this example arranged in the cab 230 of the train 200. The user terminal 130 may be a screen, a touch screen, a smartphone, or another terminal suitable for displaying information to an operator of the vehicle 200. In some embodiments, the user terminal 130 and the control unit 120 are comprised in the same device.

The system 100 may comprise a sensor 180 for monitoring accelerations or movements for the vehicle. The control unit 120 may receive data from sensor 180 in any of the same ways as from sensor 110. The control unit 120 may compare the movements or accelerations of the vehicle 200 as received from sensor 180 with the movements or accelerations of the pantograph as received from sensor 110. In this way, the control unit 120 may determine an acceleration pattern for the pantograph 210 separate from the vehicle 200, i.e. without noise from the movements of the vehicle on which the pantograph 210 is mounted. That is, the control unit 120 may determine movements originating from the interaction between the pantograph 210 and the contact wire 300, rather than movements of the whole vehicle 200.

Based on the determined acceleration pattern having accelerations above or below a predetermined level, the control unit 120 may determine a maintenance status for the pantograph 110. The predetermined level may be a fixed level, or a percentage, an interval or another change indication. The predetermined level may be based on historical data collected for the pantograph 110 arranged on the vehicle, on historical data collected for other pantographs, or another fixed value. The determination may be based on a recent time interval. For illustrative purposes only, the control unit may, for example, determine that the accelerations of the last 5 s are 50% larger than for a time period before that, and determine a maintenance status indicating that the pantograph is in need of maintenance.

The maintenance status indicates a level of wear on the pantograph 210, and may be within a predetermined range, or be one or more of a set of predetermined levels. Such levels may, for example, be no need for maintenance, low need for maintenance, high need for maintenance, or an acute need for maintenance.

If the control unit 120 determines that the pantograph 210 is in acute need of maintenance, the control unit 120 may cause the pantograph 210 to lower itself from the contact wire 300. This may help avoid damages to the contact wire 300. The control unit 120 may also cause a secondary power system, such as a secondary pantograph, to activate instead.

The control unit 120 may send an indication or an alert of the maintenance status. The alert may be received by the user terminal 130, which displays the information to an operator. The operator may then act based on the received information.

Figure 2:
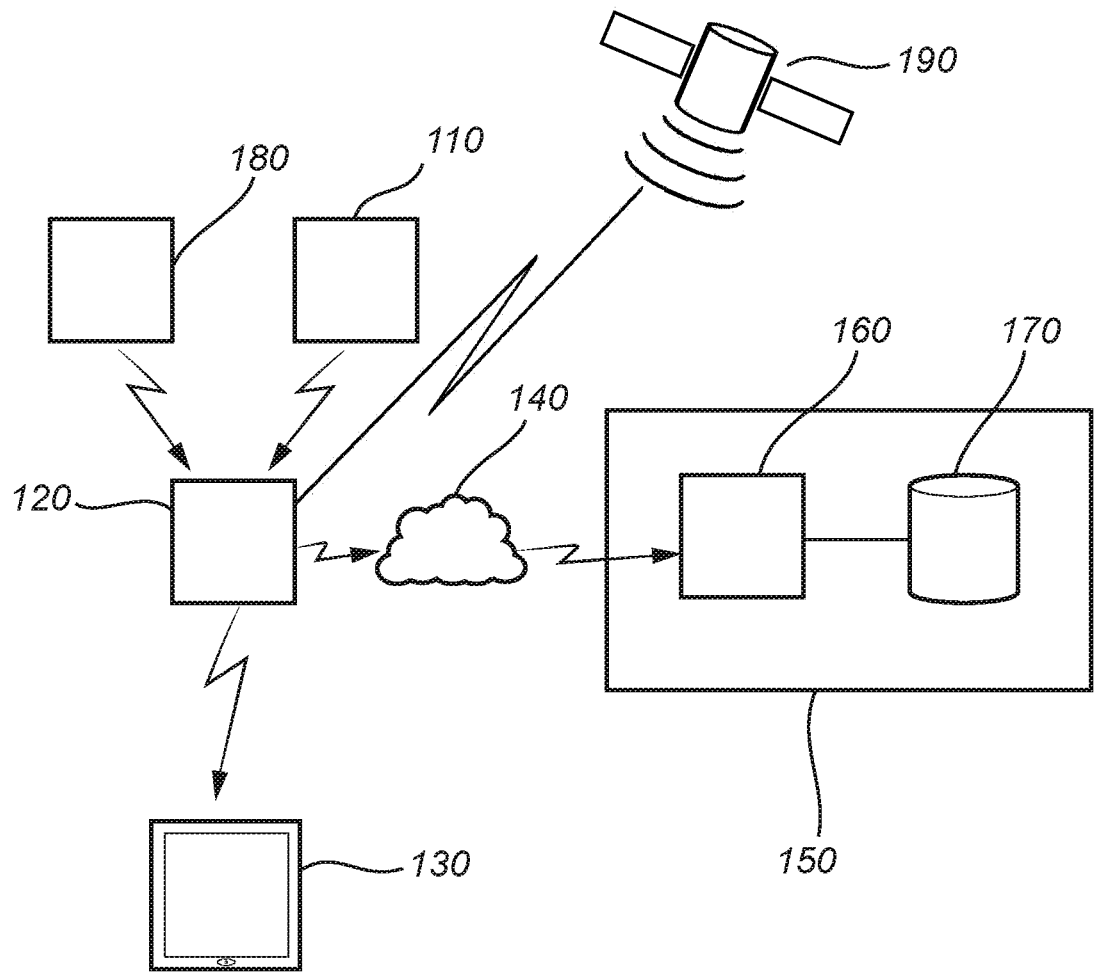
FIG. 2 is an overview of the system according to an embodiment.

An overview of the system 100 will now be described with reference to FIG. 2. The system comprises a sensor 110 for measuring accelerations of a pantograph and a control unit 120. The system may further comprise a sensor 180 for measuring accelerations of the vehicle and a user terminal.

The control unit 120, the sensors 110, 180 and the user terminal 130 may interact as described above with reference to FIG. 1. The control unit 120 may send data to a central server 150 over the Internet 140. This may be performed regularly when the control unit 120 has access to the Internet 140. The central server 150 may comprise a processing unit 160 for receiving and processing data sent from the control unit 120, and a storage unit 170 for storing data. The central server may be used for determining the predetermined intervals used by the control unit 120 when determining the acceleration patterns or maintenance status. The central server 150 may, in some examples, send data to the control unit 120. The data may, for example, be the determined predetermined intervals. The control unit 120 may send data to the central server 150 comprising measured accelerations of one or more pantograph(s) or measured accelerations of the vehicle or determined acceleration in a direction above a predetermined value in the detected acceleration pattern.

Figure 3:
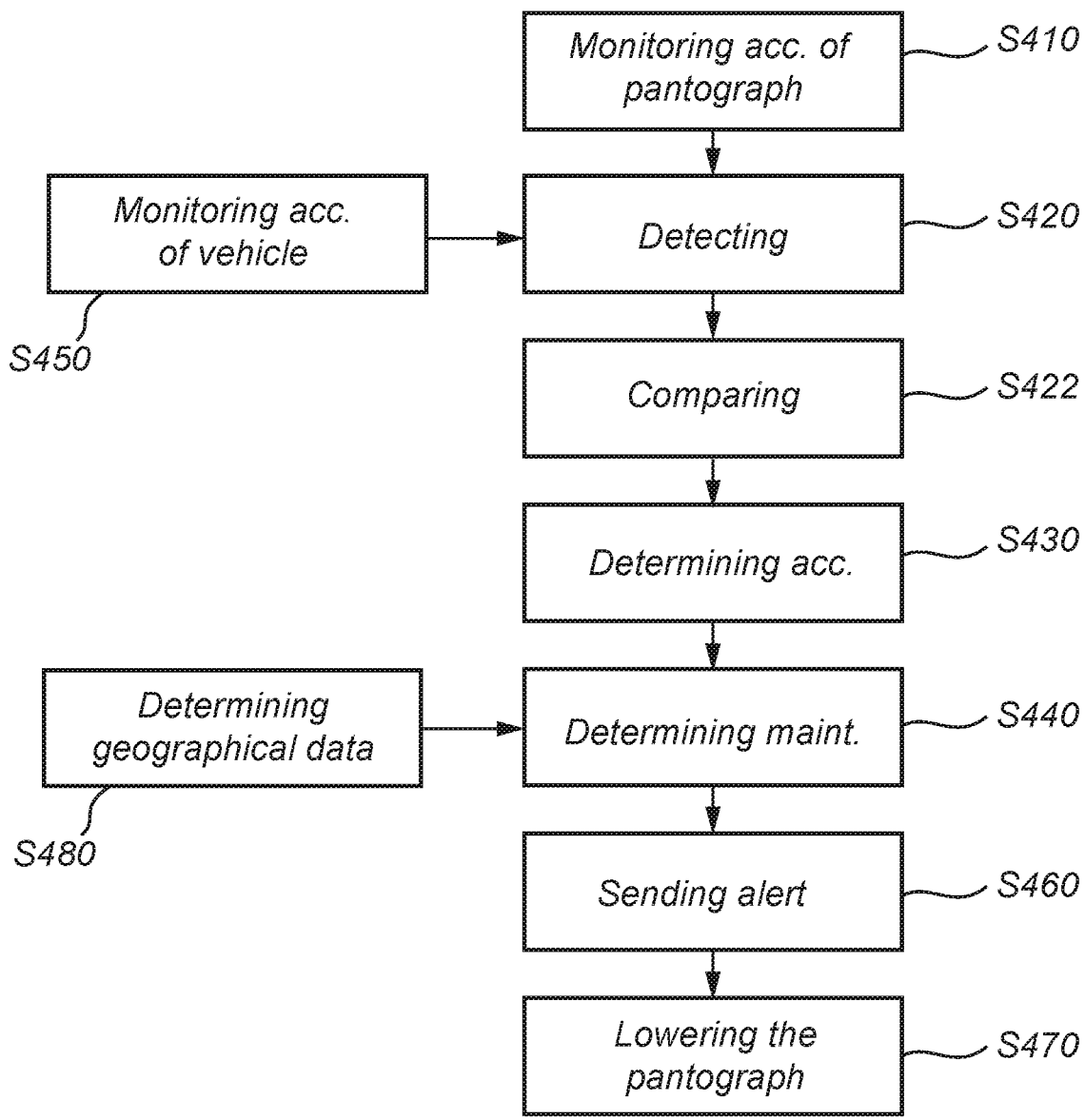
FIG. 3 is a flow diagram of the method according to an embodiment.

A flowchart of the method 400 according to some embodiments will now be described with reference to FIG. 3. The method may be implemented by a system such as any of the systems described with reference to FIG. 1 and FIG. 2.

The method comprises monitoring S410 at least longitudinal, vertical or lateral accelerations of the pantograph, detecting S420 an acceleration pattern based on the monitored accelerations, determining S430 acceleration in a direction above a predetermined value in the detected acceleration pattern, and determining S440 a maintenance status for the pantograph based on the detected acceleration pattern, and wherein the maintenance status indicates a level of wear on the pantograph.

The method may further comprise monitoring S450 accelerations of the vehicle on which the pantograph is arranged. The step of detecting S420 may comprise comparing S422 the accelerations of the vehicle with the accelerations of the pantograph to determine the accelerations of the pantograph in relation to the vehicle, or to isolate the movements caused by the interaction between the pantograph and the contact wire from the movements of the vehicle.

The method may further comprise sending S460 an alert indicating the maintenance status for the pantograph and/or contact wire. The alert may, for example, be sent to a user terminal accessible to an operator operating the vehicle, or it may be sent to a central server for processing, as described with reference to FIG. 2.

The step of determining the maintenance status S440 may be performed on-board the vehicle but may also be performed by the central server 150 located elsewhere.

The step of determining acceleration S430 in a direction above a predetermined value in the detected acceleration pattern may be performed on-board the vehicle but may also be performed by the central server 150 located elsewhere.

The method may further comprise determining geographical data S480. By analyzing the detected acceleration together with the geographical data yet another factor is achieved indicating the cause of error since this will indicate if the error is bound to the geographical position or to the vehicle. Further, by combining this with the data for measured accelerations in the pantograph and/or accelerations in the vehicle as previously disclosed it will be possible to further differentiate the measured accelerations bound to geographical position to be either induced from above the vehicle, such as for example induced from the contact wire, or from the surface on which the vehicle is traveling, such as for example the track for a track bound vehicle or road for a non-track bound vehicle.

In other words, in the step of determining the maintenance status the method may also determine, and use the geographical data to further determine cause of measured acceleration. If there is reoccurring acceleration measurement registered by one or more vehicles at the same geographical position, a conclusion might be made that the cause of error is strongly related to the geographical position and not the vehicle(s). The sensors (110, 180) may be used to further distinguish if the measured acceleration being related to geographical position is induced by the contact wire, or parts thereof above the vehicle or the road or track below the vehicle.

Determining the maintenance status may be performed on-board the vehicle but may also be performed by the central server 150 located elsewhere. In the latter case, information comprising geographical data, including at least geographical position, and measured acceleration in the vehicle and pantograph are transmitted to the central server. The data may be stored in order to make historical comparisons and track changes in measurements performed over time and by one or more vehicles. When the maintenance status is performed on-board data from other vehicles using an equivalent measurement system might also be used to further improve the on-board determination of maintenance status. For this, data comprising measured acceleration of the pantograph and vehicle, maintenance status and/or geographical data is transmitted to the control unit for analyzing data on-board the vehicle.

This will facilitate in determining the need of maintenance not only on the vehicle and pantograph but also on the contact wire and tracks.

The determination of geographical data might be achieved by any satellite navigational systems known in the art such as for example GPS, GLONASS, Galileo or BeiDou-2GS.

The determination of geographical data is preferably performed by a geographical positioning unit utilizing a global navigation satellite system adapted for any of the satellite systems known in the art, such as GPS, GLONASS, Galileo or BeiDou-2GS.

Additionally, the geographical data may help distinguish weather or not the measured acceleration in the pantograph and/or acceleration in the vehicle is caused by a faulty, i.e worn down or damaged pantograph or if the cause of the measured acceleration in the pantograph and/or acceleration in the vehicle is geographically related. In other words, the method may comprise the step of comparing the geographical data and the measured acceleration in the pantograph and/or acceleration in the vehicle to previously measured acceleration in the pantograph and/or vehicle to determine a maintenance status for the pantograph and/or vehicle.

The method may further comprise lowering S470 the pantograph from a contact wire in response to a maintenance status above a predetermined level.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for determining a maintenance status for a pantograph arranged on a vehicle and/or a contact wire intended to be in electrical contact with the pantograph, comprising the steps of:

monitoring at least longitudinal, vertical or lateral accelerations of the pantograph;
monitoring accelerations of the vehicle:
detecting an acceleration pattern based on the monitored accelerations of the pantograph, wherein the step of detecting comprises comparing accelerations of the vehicle with accelerations of the pantograph to determine the accelerations of the pantograph in relation to the contact wire;
determining accelerations in a direction above a predetermined value in the detected acceleration pattern; and
determining a maintenance status for the pantograph and/or the contact wire based on the detected acceleration pattern, and wherein the maintenance status indicates a level of wear on the pantograph and/or the contact wire.

2. The method according to claim 1, wherein the accelerations are measured by a sensor arranged on the pantograph.

3. The method according to claim 1, further comprising sending an alert indicating the maintenance status.

4. The method according to claim 1, further comprising lowering the pantograph from the contact wire in response to a maintenance status above a predetermined level.

5. The method according to claim 1, wherein a group of possible maintenance statuses comprises at least indications for a no need for maintenance, a low need for maintenance or an acute need for maintenance.

6. The method according to claim 1, further comprising registering geographical data and combine information of geographical data with detected acceleration of pantograph and/or the vehicle.

7. The method according to claim 1, further comprising registering geographical data when detected maintenance status is above a predetermined level.

8. A system for determining a maintenance status for a pantograph arranged on a vehicle and/or a contact wire intended to be in electrical contact with the pantograph, comprising:

a sensor arranged to monitor longitudinal, vertical or lateral accelerations of a pantograph of a vehicle; and
a control unit adapted to receive data about the accelerations from the sensor and perform the method according to claim 1.

9. The system according to claim 8, wherein the control unit is configured to send an alert indicating a maintenance status.

10. The system according to claim 8, wherein the sensor is connected to the control unit via wireless communication means.

11. The system according to claim 10, wherein the wireless communication means is a local wireless network.

12. The system according to claim 8, further comprising a central server connected to the control unit.

13. The system according to claim 8, further comprising a user terminal connected to the control unit.

14. The system according to claim 8, wherein the monitoring is performed periodically.

15. The system according to claim 8, further comprising a geographical positioning unit utilizing a global navigation satellite system.

16. The system according to claim 8, further comprising an additional sensor located further away from the contact wire than the sensor, preferably on the vehicle or on the pantograph.

* * * * *